Nov. 12, 1940.  E. A. HOOPES  2,221,050

BLENDING CHAMBER FOR WATER MIXING VALVES

Filed Nov. 12, 1938

INVENTOR.
E. A. HOOPES
BY M. Talbert Dick
ATTORNEY

Patented Nov. 12, 1940

2,221,050

UNITED STATES PATENT OFFICE 2,221,050

BLENDING CHAMBER FOR WATER MIXING VALVES

Ernest A. Hoopes, Des Moines, Iowa

Application November 12, 1938, Serial No. 240,109

1 Claim. (Cl. 137—111)

The principal object of this invention is to provide a blending chamber for water mixing valves that blends the alternate flow of hot and cold water and smoothes out the pulsations between impulses, thereby permitting a smooth exit flow of water of uniform temperature.

A further object of my invention is to provide a blending chamber for thermostatically controlled water mixing valves that distributes the water radially into the chamber, blending the water thoroughly throughout the capacity of the chamber assuring uniformity of mixture.

A still further object of this invention is to provide a blending chamber for water mixing valves that is economical in manufacture, durable and efficient in use.

These and other objects will be apparent to those skilled in the art.

My invention consists in the construction, arrangement and combination of the various parts of the device, whereby the objects contemplated are attained as hereinafter more fully set forth, pointed out in my claim and illustrated in the accompanying drawing, in which:

Heretofore in the art of thermostatic mixing and controlling water, it has been noted that the water after passing through the thermostatic control chamber is not mixed and pulsates from hot to cold and with varying intensity during the operation of the thermostatic control valves. Therefore, the rate of flow of water from the device has not been uniform and the water has not come out thoroughly mixed and blended. It is to overcome such disadvantages that I have provided my blending chamber for water mixing valves which I will now describe.

Figure 1:
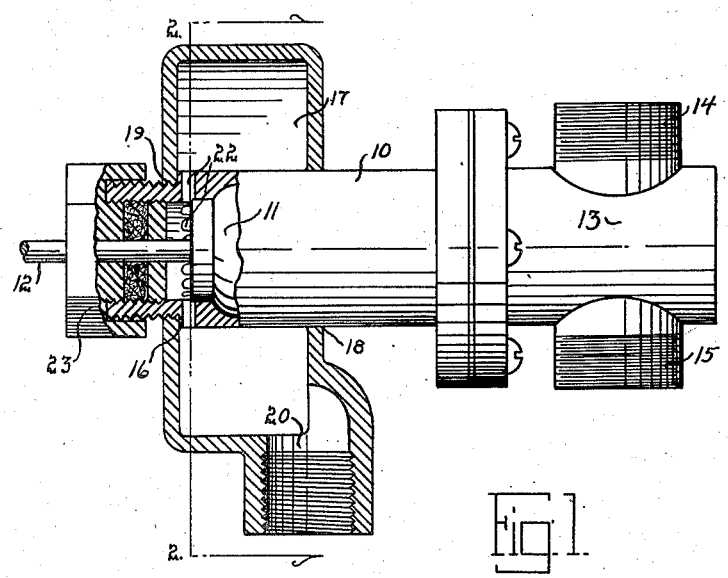
Fig. 1 is a side sectional view of my chamber having installed in conjunction therewith an ordinary thermostatic water controller.
Figure 2:
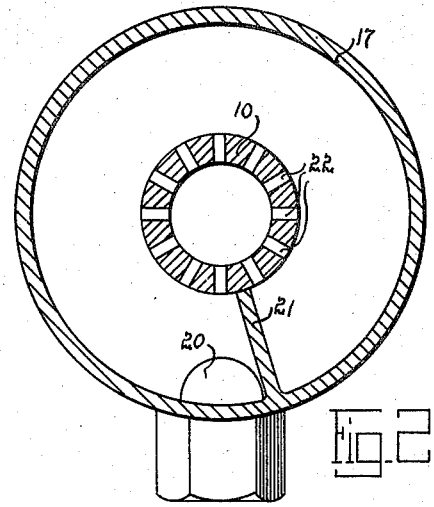
Fig. 2 is an end sectional view of my mixing blending chamber taken on line 2—2 of Fig. 1.
Figure 3:
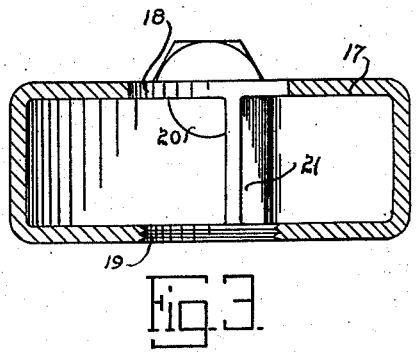
Fig. 3 is a top cross sectional view of the chamber portion of my device more fully illustrating its construction.

Referring to the drawing, I have used the numeral 10 to designate a cylindrical sleeve within which is an ordinary thermostatic water mixing valve 11 having the manual control rod 12 for adjusting the thermostatic unit. The numeral 13 designates a chamber fitted on one end of the sleeve 10 having in communication therewith the hot and cold water inlet pipes 14 and 15 respectively. I have used the numeral 16 to indicate a shoulder formed on one end of the sleeve 10. The forward end of this sleeve 16 is threaded as shown in Fig. 1 of the drawing. It is onto this sleeve 10 that I place the chamber proper which I will now describe. The numeral 17 designates a cylindrical chamber having an opening 18 in one of its faces capable of tightly embracing the outer peripheral edge of the sleeve 10. The numeral 19 designates a threaded opening in the other face of the chamber 17 for permitting the threaded portion of the sleeve 10 to be threaded thereon until the shoulder 16 contacts the inner face of the chamber 17 as shown in the drawing. When placing the chamber 17 on the sleeve 10, the joints between the sleeve 10 and the chamber 17 may be soldered together or, as is the usual case, sweated together. I have used the numeral 20 to designate an outlet passageway communicating with the inside of the chamber 17. The numeral 21 indicates a baffle wall integrally formed in the chamber or housing 17 extending from its outer inside edge to a point adjacent the sleeve 10 as shown in Fig. 2 and Fig. 3 of the drawing. This baffle 21 is to one side of the opening or inlet 20 and forces the water to travel in one direction through the chamber. I have used the numeral 22 to indicate a plurality of radially extending holes cut through the sleeve 10 for permitting water to flow from the inside of the sleeve 10 into the chamber 17 as shown in Figs. 1 and 2 of the drawing. The numeral 23 indicates a packing gland nut for preventing leakage of water from the end of the sleeve around the manual control rod 12.

The practical operation of my device is as follows: Hot water is introduced through the pipe 14 and cold water through the pipe 15. The flow of this water through the sleeve 10 is controlled by the ordinary type of valve operated by the ordinary thermostatically controlled element 11. This water admitted in impulses of alternate hot and cold through the thermostatic element travels in stratas and it is necessary, for smooth water control, to smooth out these impulses and provide a means for blending the water so that the mass will be of one uniform temperature. With my device, the water flows through the holes 22 into the chamber 17 in all directions. The baffle element 21 permits the water to flow in only one direction through the chamber and transversely of the water issuing from the ports 22 forcing the water to blend in the chamber. Inasmuch as the chamber 17 has a capacity in excess of the volume admitted through the holes 22 or permitted to leave the chamber through the outlet 20, the effect of the volume of water within the chamber 17 will smooth out the varying pulsations of the water flow occasioned by the action of the thermostatic element and water will be admitted into the chamber 17 radially in all directions and transversely to the flow of water out of the chamber 17, thereby breaking up the stratas or currents of alternate hot and cold water blending the water, to such a degree that the entire volume of water issuing through the exit port 20 will be of uniform temperature throughout its bulk. It will here be noted that for convenience of installation and to permit the piping for water to be behind the finished wall or like, the outlet passageway 20 is offset so that all of the plumbing fixtures connected with the valve and chamber can be to the rear of its face. Thus it will be seen that I have provided a blending chamber for water mixing valves which radially dispenses water, after it has passed through the thermostatic control valve portion, into a chamber having a greater capacity for water than the volume admitted through the radially extending inlet ports into the chamber. Also this radial dispersion of water into the chamber assures cross currents for mingling of the hot and cold water especially in view of the fact that some of the water travels from the baffle plate around the sleeve 10 to the outlet port 20 causing blending and controlling the flow of water issuing from the thermostatic unit. All sudden surges and impulses caused by the intermittent operation of the valves are smoothed out and exact water temperature is always maintained. Obviously there are many variations employing the same principles and the flow may be reversed through my device with the same effect as is possible with the device as shown in the accompanying drawing. Obviously, my blending chamber may be used in the blending of any type of fluid where it is necessary to break up the fluid in order that it completely blends into a uniform and consistent body.

Furthermore, it is obvious that my type of chamber may be compounded to any extent necessary to accommodate an extensive volume or flow of fluid and there may be as many inlet ports into these chambers as is necessary to accommodate a given amount of the fluids to be blended.

Some changes may be made in the construction and arrangement of my improved blending chamber for water mixing valves without departing from the real spirit and purpose of my invention, and it is my intention to cover by my claim any modified forms of structure or use of mechanical equivalents which may be reasonably included within its scope.

I claim:

In a blending chamber for water mixing valves, a housing, a tubular sleeve element extending into the center portion of said housing and designed to be in communication with a source of hot fluid and a source of cold fluid, a continuous row of radially extending outlet passageways in said tubular sleeve element extending completely around the periphery of said tubular sleeve element and communicating with the inside of said housing, a straight partition baffle wall in said housing extending from said tubular sleeve element, and an outlet passageway in the side of said housing extending outwardly and radially relative to said tubular sleeve element and positioned adjacent one side of said straight partition baffle wall.

ERNEST A. HOOPES.